United States Patent [19]

Quirk et al.

[11] Patent Number: 4,870,870

[45] Date of Patent: Oct. 3, 1989

[54] SHAKER

[75] Inventors: Michael J. Quirk; Timothy E. Drake, both of Westfield, N.Y.

[73] Assignee: Renold, Inc., Westfield, N.Y.

[21] Appl. No.: 322,559

[22] Filed: Mar. 13, 1989

[51] Int. Cl.⁴ ........................................ F16H 33/00

[52] U.S. Cl. ........................................ 74/61; 464/170

[58] Field of Search .................... 74/61; 464/170, 178

[56] References Cited

U.S. PATENT DOCUMENTS

| | | | |
|---|---|---|---|
| 2,766,629 | 10/1956 | Booth | 74/61 |
| 2,778,230 | 1/1957 | Peterson | 74/61 |
| 2,793,009 | 5/1957 | Peterson | 74/61 X |

FOREIGN PATENT DOCUMENTS

| | | | |
|---|---|---|---|
| 247089 | 11/1947 | Switzerland | 74/61 |

*Primary Examiner*—James T. McCall
*Attorney, Agent, or Firm*—Charles L. Lovercheck; Wayne L. Lovercheck; Dale R. Lovercheck

[57] ABSTRACT

A shaker having a hollow housing in the form generally of two hollow cylinders with the central axes disposed from one another and integrally connected together with a closed end and an end shield covering the second end. A first shaft is supported on bearings in the first cylinder concentric to it, with an eccentric weight attached to the first shaft. A second shaft concentric to the second cylinder is supported on bearings concentric to the second cylinder. Only one end of the housing, the other end is closed, has an end cap and the shafts are connected by helical pinions so that the helical pinions urge the weights and shafts in opposite directions from one another.

22 Claims, 2 Drawing Sheets

SHAKER

BACKGROUND OF THE INVENTION

Shakers according to the prior art had three piece bodies made up of a housing and two end covers. A web of webs were integrally attached to the housing and acted as supports for one end of the shafts carrying the eccentric weights.

STATEMENT OF THE INVENTION

Features of the new design shaker disclosed herein are:

The housing and one end cover are cast as an integral piece. The web commonly used in prior shakers in the housing is eliminated allowing eccentric weights to swing closer to one another. This simplifies the construction and reduces "shaker couple". The shaker uses a pre-greased and sealed outer bearing which eliminates the need for oil return passages drilled in cover. The smooth outside lines eliminate "pockets" in the casing for dirt build-up. The conventional six (6) radially located oil plugs ar replaced by two (2) magnetic plugs located on the sides of the shaker. A "V-ring" seal is used on the shaft instead of the more common lip seal. The inner bearing is captured in the housing shoulder which eliminates the need for a retainer ring on the eccentric weight hub.

The design is further simplified by the features that: (1) as one example, no stub end cap is required, (2) no bearing retaining nut is required. These features eliminate a threading operation. A keyway, previously used, is eliminated as well as a tanged lock washer to lock the retaining nut.

OBJECTS OF THE INVENTION

It is an object of the invention to provide an improved shaker construction.

It is another object to provide a shaker that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE DRAWINGS

Figure 1:
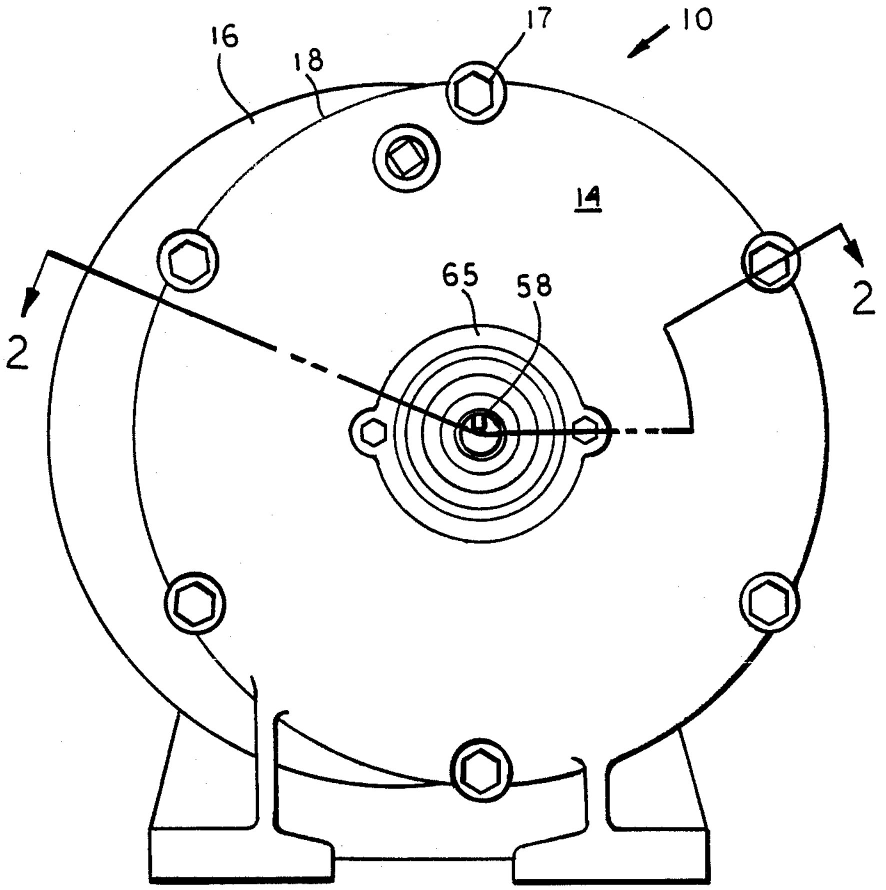
FIG. 1 is an end view of the shaker according to the invention.

Now with more particular reference to the drawings, I show a shaker 10, made up of a hollow body, having a generally cylindrical housing 12, a closed first end 24 integrally attached to housing 12, and an open end which is closed by end cover 14. First shaft 30 has central axis 20. Magnetic oil plug 15, is located in a threaded hole in closed first end 24. Second shaft 42 has central axis 22. First eccentric weight 34 is attached to first shaft 30 by means of first hub 60 and second eccentric weight 54 is attached to second shaft 42 by means of second hub 68. Shafts 30 and 42 are connected together to rotate in opposite directions by a coupling means made up of first helical pinion 32 and second helical pinion 48.

Closed first end 24 of shaker 10 has first bore 26 therein. First bearing 28 is supported in first bore 26 in housing 12. Third bearing 29 is received in first counterbore 27 in closed first end 24. Third bearing 29 rotatably receives first hub 60. First hub 60 receives first shaft 30 at a position spaced from first bearing 28. First shaft 30 is fixed to first hub 60. Second bearing 40 is supported in second bore 38 and fourth bearing 62 rotatably receives second hub 68, which is attached to second weight 54. Key 72 can be placed between first hub 60 and second hub 68. Key 74 can be placed between first shaft 30 and second shaft 42. Attaching means 58, which may be a key, is provided on second shaft 42 for connecting a driving member, such as a motor, to second shaft 42 for driving shaker 10.

Figure 2:
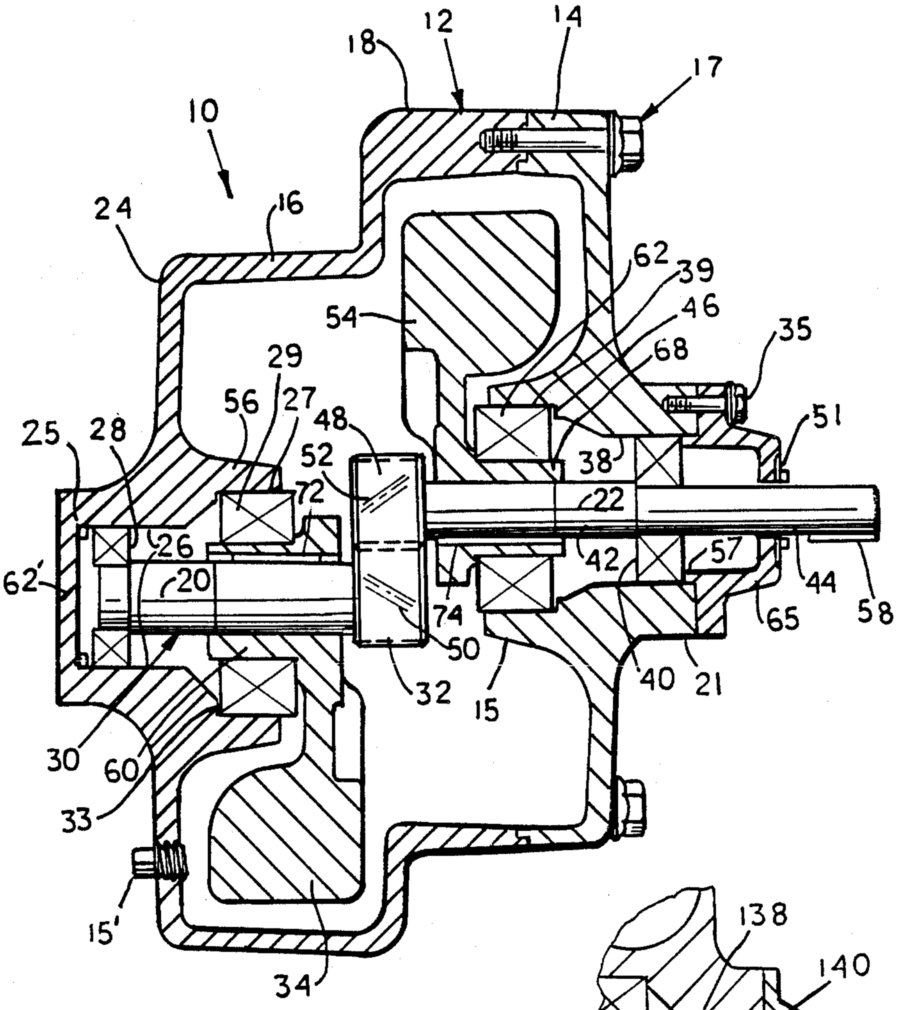
FIG. 2 is a longitudinal cross sectional view of the shaker according to the invention, taken on line 2–2 of FIG. 1.

In the embodiment of FIGS. 1 and 2, first helical teeth 50 on first helical pinion 32 and second helical teeth 52 on second helical pinion 48 are inclined so that when second shaft 42 is rotated in a first direction by a motor connected to end 44 of second shaft 42, first shaft 30 will be rotated in the opposite direction. The incline of second helical teeth 52, relative to first helical teeth 50 urge first helical pinion 32 to move first shaft 30 and second shaft 42 in opposite axial directions.

Closed end 24 of shaker 10 has inwardly extending first flange 56 and outwardly extending third flange 25 integrally attached to it. First bore 26 extends out into third flange 25 and terminates in closed end 62'. Inwardly extending first flange 56 has first counterbore 27 in it. Counterbore 27 has shoulder 33, which acts as a stop to limit the movement of third bearing 29. The bearings used are referred to as anti-friction. Such bearings are known as deep groove ball bearings, or sperical rollers, which have very low frictional characteristics.

End cover 14 has inwardly extending second flange 15 and outwardly extending flange fourth flange 21 integrally attached to it. Second bore 38 is formed in outwardly extending fourth flange 21. Inwardly extending second flange 15 has second counterbore 39 formed therein, terminating in bottom 46, which as a stop for fourth bearing 62.

End cap 65 is supported over first bore 38 in end cover 14 and bottom cap screws 17 hold end cover 14 in place. Studs 35 hold end cap 65 in place. End cap 65 has inwardly extending stop 57, in the form of a flange, which fits into second bore 38 and acts as a stop for second bearing 40, limiting the outward movement of second bearing 40. Seal 51 prevents entry of dirt or moisture from outside and could prevent leakage of oil around rotating shaft 42. Seal 51 could be formed by a V-seal in the form of a resilient ring frictionally supported on the shaft end engaging end cap 65.

Housing 12 is made up of first cylindrical member 16, having a central axis coextensive with central axis 20 of first shaft 30. Second cylindrical member 18 is integrally attached to first cylindrical member 16, and having a central axis, which is common with central axis 22 of second shaft 42.

Figure 3:
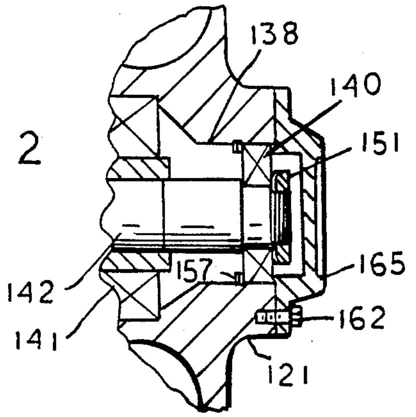
FIG. 3 is a partial view of another embodiment of the invention.

Now with regard to the embodiment of the invention shown in FIG. 3, shaker housing, shafts, bearings, weights and other parts are identical to housing 12, shafts 30 and 42, bearings 28, 29, 40 and 62 of the embodiment of the shaker shown in FIGS. 1 and 2, except that flange 121, shown in FIG. 3, terminates at its end remote from end 24 in a flat end surface defining an open end of bore 138. A snap ring 157 is received in an internal groove in flange 121. Bore 138 receives bearing 141, similar to bearing 40 in bore 38. Lock nut 151 is received on the threaded end of shaft 142. Snap ring 157 holds bearing 140 in position against second end cap 165. End cap 165 is held in place by studs 162 against the flat end of first end 124.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A shaker comprising a hollow housing with an open end and a closed end,
a generally circular end cover covering said open end,
said generally circular end cover having a concentric opening therethrough,
said housing being in the form generally of a hollow cylindrical member,
attaching means attaching said generally circular end cover to said housing,
a first shaft and second shaft,
a first bearing means on said first shaft and supported on said housing,
a second bearing means on said second shaft and supported on said generally circular end cover at said concentric opening therethrough,
said second shaft extends through said concentric opening in said generally circular end cover,
sealing means supported on said generally circular end cover engages said second shaft,
a first eccentric weight being supported on said first shaft by a first hub,
a second eccentric weight being supported on said second shaft by a second hub supporting said second weight on said second shaft,
coupling means connecting said first shaft to said second shaft,
said closed end terminates in a permanent closure thereon remote from said open end supporting said first bearing.

2. The shaker recited in claim 1 wherein said closed end is closed by an end cover attached to said housing,
said first shaft has a lock nut on said first end holding said first bearing to said first shaft and,
a removable cover on said closed end of said hollow housing providing access to said first bearing.

3. The shaker recited in claim 1 wherein said housing comprises a first generally hollow cylindrical member and a second generally hollow cylindrical member,
said first hollow cylindrical member having a central axis.
said second hollow cylindrical member having a central axis,
said central axis of said first hollow cylindrical member being parallel to and spaced from said central axis of said second cylindrical axis,
said first shaft having a central axis coextensive with said central axis of said first hollow cylindrical member,
said second shaft having a central axis coextensive with said central axis of said second hollow cylindrical member.

4. The shaker recited in claim 1 wherein said coupling means comprises said first shaft having a first helical pinion,
said second shaft having a second helical pinion,
a third flange on said closed end,
a fourth flange on said generally circular end cover,
said first helical pinion and said second helical pinion being in engagement with one another and being adapted to force said first shaft and said second shaft apart bringing said second bearing means into engagement with said third flange on said closed first end and bringing said fourth bearing into engagement with said fourth flange when said first shaft and said second shaft are rotated.

5. The shaker recited in claim 1 wherein said closed first end has a first bore,
said first bore has a first counterbore,
said first bearing means comprises a first bearing in said first bore and a third bearing in said first counterbore,
said first bearing and said third bearing being spaced from one another,
said first shaft extending through said first bearing and said third bearing.

6. The shaker recited in claim 1 wherein a second bore has a second counterbore therein,
said second bearing is received in said second bore,
a fourth bearing is received in said second counterbore,
said second shaft extending through said fourth bearing.

7. The shaker recited in claim 4 wherein said first helical pinion has first inclined helical teeth,
said second helical pinion has second inclined helical teeth inclined in a direction to urge said weights and said second bearing and said fourth bearing in a direction away from one another,
said first inclined helical teeth meshing with said second inclined helical teeth.

8. The shaker recited in claim 5 wherein said first weight has a first hub fixed thereto,
said second weight has a second hub fixed thereto,
said first hub receives said first shaft,
said second hub receives said second shaft.

9. The shaker recited in claim 6 wherein said first hub is fixed to said first shaft,
said first hub has a first cylinder part received in said third bearing and a shoulder on said shaker abutting against the inner side of said first bearing.

10. The shaker recited in claim 9 wherein said second counterbore has a bottom,
said fourth bearing rests on said bottom of said second counterbore forming a stop limiting the movement of said fourth bearing.

11. The shaker recited in claim 10 wherein said bearings are anti-friction bearings.

12. The shaker recited in claim 11 wherein said first shaft has a reduced size end received in said first bearing.

13. The shaker recited in claim 12 wherein a second attaching means fixes said fourth bearing to said second shaft.

14. The shaker recited in claim 12 wherein an end cap is fixed to said generally circular end cover over said second bore, said second shaft extends through a central opening in said end cap.

15. The shaker recited in claim 12 wherein a seal is supported on said end cap around said central opening.

16. A shaker, said shaker comprising a housing and a generally circular end cover, said housing comprising an outer wall and having a first generally cylindrical part and a second generally cylindrical part, said first generally cylindrical part having a first central axis, said second generally cylindrical part having a second cylindrical axis, said first central axis and said second central axis being offset from one another, said first cylindrical part and said second cylindrical part being integrally attached to one another, said first cylindrical part having a closed end integrally attached thereto, said second cylindrical part having an open end, said closed end having a first cylindrical bore, said first cylindrical bore having a central axis concentric with said first central axis, a first bearing in said first cylindrical bore, a first shaft having a first end and a second end, said first end of said first shaft being received in said first bearing, a first pinion on said second end of said first shaft, a first weight fixed to said first shaft between said first end and said second end, attaching means attaching said generally circular end cover to said open end of said second cylindrical part, said generally circular end cover having a second bore therein, a second bearing received in said bore, a second shaft, said second shaft having a first end and a second end, said first end of said second shaft being received in said second bearing, said second end of said second shaft having a second helical pinion, said first helical pinion, having first external helical teeth engaging second helical teeth on said second helical pinion, a second weight fixed to said second shaft between said first end and said second end.

17. The shaker recited in claim 16 wherein third flange on said housing limits the axial movement of said first bearing, fourth flange on said generally circular end cover limits the axial movement of said third bearing, said first helical teeth and said second helical teeth are inclined in a direction to hold said first bearing against said third flange.

18. The shaker recited in claim 17 wherein said closed end has a cylindrical inwardly extending first flange, a first counterbore is formed in said first flange, said second bearing is received in said second bore, a second flange is fixed to said generally circular end cover, second counterbore is formed in said second flange, a fourth bearing is disposed in said second counterbore, said second shaft extends through said fourth bearing.

19. The shaker recited in claim 18 wherein an end cap is attached to said generally circular end cover, said end cap having a central opening, said end cap has a stop engaging said second bearing limiting the axial movement of said second bearing.

20. The shaker recited in claim 19 wherein a first hub has a first hollow bore therein, said first shaft being received in said hollow bore.

21. The shaker recited in claim 20 wherein a second hub is fixed to said second weight.

22. The shaker recited in claim 21 wherein said end cap has an oil seal thereon engaging said second shaft.

* * * * *